United States Patent [19]

Newell

[11] Patent Number: 4,855,336
[45] Date of Patent: Aug. 8, 1989

[54] FRICTION MATERIAL CONTAINING MILL SCALE

[75] Inventor: Charles E. Newell, Troy, N.Y.

[73] Assignee: Allied-Signal Inc., Morristown, N.J.

[21] Appl. No.: 223,494

[22] Filed: Jul. 25, 1988

[51] Int. Cl.⁴ .............................. C08K 3/22; C08J 5/14
[52] U.S. Cl. ................................... 523/152; 523/153;
523/155; 523/156; 523/157; 523/158
[58] Field of Search ................. 523/152, 153, 155, 156, 523/157, 158

[56] References Cited

U.S. PATENT DOCUMENTS

| | | | |
|---|---|---|---|
| 3,434,998 | 3/1969 | Aldrich et al. | 523/153 |
| 3,835,118 | 9/1974 | Rhee et al. | 523/155 |
| 4,197,385 | 4/1980 | Laitar | 525/501 |
| 4,373,037 | 2/1983 | Washabaugh | 523/155 |

*Primary Examiner*—Lewis T. Jacobs
*Attorney, Agent, or Firm*—Leo H. McCormick, Jr.; Ken C. Decker

[57] ABSTRACT

In a friction material wherein sponge iron is a principle friction producing component especially on initial engagement during a brake application, the improvement wherein 10-50% of the sponge iron is replaced with mill scale without a substantial change in the operational characteristics of the friction material.

5 Claims, 1 Drawing Sheet

| INGREDIENT | A | B | C | D | E |
|---|---|---|---|---|---|
| SPONGE IRON | 53 | 36 | 36 | 19 | 27 |
| MILL SCALE |  | 14 | 14 | 33 | 27 |
| STEEL FIBER | 10 | 11 | 11 | 11 | 11 |
| GRAPHITE | 18 | 18 | 18 | 18 | 18 |
| * FRICTION MODIFIER | 12 | 13 | 13 | 13 | 13 |
| RESIN | 7 | 8 | 8 | 8 | 8 |

\* FRICTION MODIFIERS

RUBBER = 2%
MAGNESIUM OXIDE = 3%
$BaSO_4$ = 7%

30 MPH   FIG. 2

60 MPH   FIG. 3

FRICTION MATERIAL CONTAINING MILL SCALE

This invention relates to a friction material wherein mill scale is substituted for a portion of sponge iron particles contained therein.

In recent years it has become apparent that it is necessary to recycle and reuse materials which have previously simply been discarded as trash and to find uses for many of the waste products produced by industrial manufacturing processes. The steel industry has long recognized that it would be desirable to find a use for mill scale which is generated in the production of steel. Mill scale is specifically the oxidized surface of steel produced during heating for working and during hot working of steel.

The presence of mill scale on the surface of ingots, strips, or sheets of steel is objectionable when further processing is required. For example, the oxide must be removed and a clean surface provided if satisfactory results are to be obtained from the hot-rolled sheet or strip in any operation involving deformation of the material. If the sheet is used for drawing applications, removal of the oxide is essential, as the presence of oxide on the steel surface tends to shorten die life, cause irregular drawing conditions and destroy surface smoothness of the finished product. Oxide removal is also necessary if the sheet or strip is to be used for further processing involving coating in order to permit proper alloying with metallic coatings and satisfactory adherence when a non-metallic coating or paint is used.

Thus, a steel mill will produce a large quantity of mill scale over a period of time. The percentage of the mill scale used in industry as compared to that produced is small and as a result mounds of waste around steel mills contain large amounts of mill scale.

During the manufacture of steel, the formation of mill scale is a continuous operation through the alternate formation and reduction of oxides of iron. In such manufacture $FE_2O_3$ is formed first and then reduced successively to $Fe_3O_4$ and $FeO$ by the availability of iron. Additional $Fe_3O_3$ is formed at the atmosphere-surface interface and the process becomes continuous. The final result is a scale composed of layers riches in oxygen at the scale surface and richest in iron a the metal surface. FeO, the layer next to the steel constitutes about 85 percent of the scale thickness, $Fe_3O_4$ about 10 to 15 percent and $Fe_2O_3$ about 0.5 to 2 percent. The mill scale which is considered to be a particle, of which at least 50% of that produced will pass through a +60 mesh. While mill scale physical characteristics can vary it is usually dark blue in color, irregular in shape and considered to be hard and abrasive. To date the use of mill scale other than as a scrap additive in the production of steel is very limited.

Since both mill scale and sponge iron are a derivative of iron ore, it was decided to attempt to substitute mill scale for a portion of the sponge iron in a friction material of the type disclosed in U.S. Pat. No. 3,835,118. This type friction material is generally accepted by the industry as a base line non-asbestos friction material which meets the current stopping requirement for most vehicles and in particular vehicles that require frequent or emergency stops such as buses, taxis, police vehicles, etc.

A friction material in accordance with this invention was made up of: sponge iron particles; friction modifiers (graphite, rubber, and barytes), reinforcing fiber (steel fibers); and 14% by weight of mill scale which is about a 1 to 10 ration of the sponge iron; and phenolic resin. The resulting friction material was made into a brake pad. When compared with a typical brake pad made according to a standard composition as disclosed in U.S. Pat. No. 3,835,118 the invention was substantially identical with respect to noise, friction and wear.

It is an advantage of this invention to be able to use a heretofore waste material, mill scale, in a manner to produce friction material having similar operation characteristics with a current base line non-asbestos friction material.

It is an object of this invention to substitute mill scale for sponge iron at about a 1 to 10 ratio in a base line friction material without substantially altering its operating characteristics.

The advantage of being able to manufacture a friction material with less costly materials should be obvious when the resultant friction possess substantially the same operating characteristics as a base line friction material made with higher priced materials.

FIG. 2 is a graph comparing deceleration and line pressure for various composition required to effect a brake application for a vehicle from 30 mph; and FIG. 3 is a graph comparing deceleration and line pressure required to effect a brake application for a vehicle from 60 mph.

Figure 1:
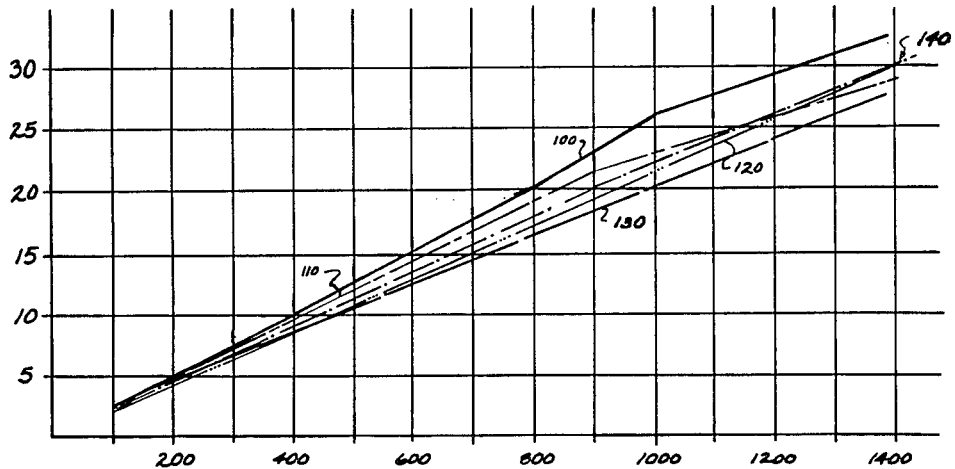
FIG. 1 is a table listing the ingredients for the friction material made according to this invention.
Figure 1:
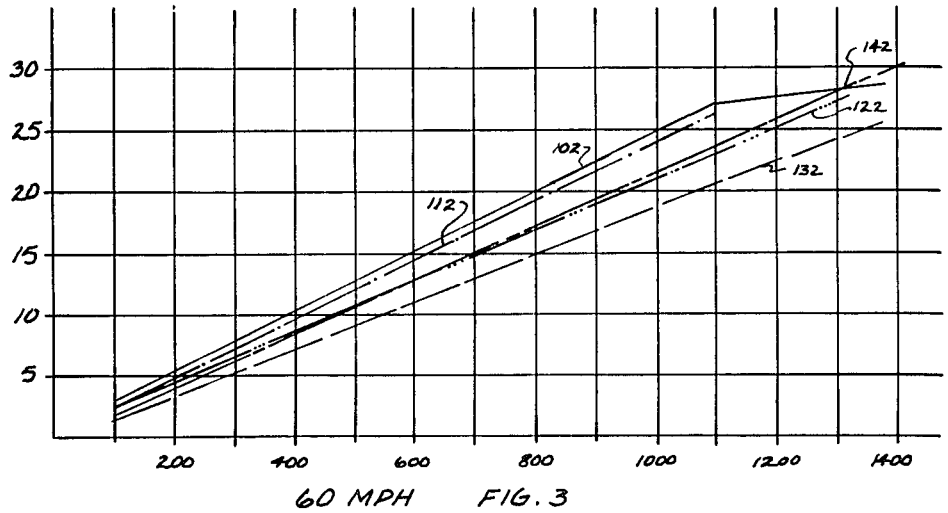

In order to establish a base line friction material with which to evaluate this invention, a friction material identified in the table of FIG. 1 as composition A was made according to the principles disclosed in U.S. Pat. No. 3,835,118.

The friction material of composition A was installed on a 1985 Ford LTD station wagon. A test schedule identified as 136L by Ford Motor Company was performed with this vehicle equipped with composition A. In this test the effectiveness of a friction material for the brake system is measured by evaluating the stopping of the vehicle from a set speed using various fluid pressures.

The effectiveness of composition A from 30 mph (48.3 Km/H) is illustrated by curve 100 in FIG. 2 and from 60 mph (96.6 Km/H) by curve 102 in FIG. 3. The average noise during this test was measured at 8.5 which means that sounds generated during braking would not be objectionable or heard by most drivers. The wear for composition A in this brake system was calculated to be greater than 43,000 miles.

A mill scale material by Keystone Steel and Wire Company of Peoria, Illinois under the name of steel scale was obtained. The mill scale after hammer milling through a 16" hole and screened through 18 mesh screen had a particle size such that about 50% passed through a +60 mesh and about 85% retained on +325 mesh. Analyses of the particle indicated a composition of about 85% FeO, 12% $Fe_3O_4$ and 3% $Fe_2O_3$. This analysis is considered to be in the normal generic range for mill scale. Ten percent of this mill scale was substituted for the sponge iron in composition A to produced composition B shown in the table in FIG. 1.

Composition B was made into brake pads and installed on the test vehicle. Test schedule 136L indicated an effectiveness of composition B for the brake system for 30 mph (48.3 Km/H) as illustrated by curve 110 and for 60 mph (96.6 Km/H) as illustrated by curve 112. In conducting this test schedule for composition B, the recorded noise was equivalent to composition A and the projected wear was about 42,000 miles.

In order to further evaluate the substitution of mill scale in a friction material, a second mill scale was obtained from Pryon Corporation of Niagara Falls, N.Y. The physical and chemical composition of this second mill scale obtained from Pryon was essentially identical to that obtained from Keystone. The Pryon mill scale did not need to be hammer milled or screened.

Ten percent of the sponge iron in Composition A was replaced with the mill scale obtained from Pryon to produce friction material composition C shown in the table of FIG. 1. Composition C was made into brake pads and tested on the test vehicle. Test schedule 136L indicated an effectiveness of composition C for the brake system at 30 mph (48.3 Km/H) as illustrated by curve 120 and at 60 mph (96.6 Km/H) by curve 122. The effectiveness of composition C is considered to be the equivalent of composition A, however, there was a reduction in the measured noise level and the projected wear for the system of about 45,000 miles is an improvement over composition A.

In evaluating compositions B and C it was observed that composition C had at least 65% passing through the +60 mesh screen and as a conclusion it is felt that a smaller size particle may be responsible for the improved wear and noise abatement of Composition C.

To establish a range for the mill scale in a friction material composition, the mill scale in composition C was increased to 33% by weight while correspondingly reducing the sponge iron content to produce composition D shown in the table of FIG. 1.

Brake lining pads were made from Composition D and tested on the vehicle. Test schedule 136L indicated an effectiveness of composition D for 30 mph (48.3 Km/H) as illustrated by curve 130 in FIG. 2 and for 60 mph (96.6 Km/H) by curve 132 in FIG. 3. During the test on the vehicle the measure noise for composition P was greater than composition a while the projected wear for the system was about 38,000 miles. Composition D would appear to suggest then that an overall decrease of about 10% in effectiveness, noise and wear from Composition A could be expected with a type formulation wherein the percentage of mill scale is about twice the amount of sponge iron in a friction material.

To further evaluate the mill scale in a friction material, composition A was modified such that equal amounts of mill scale and sponge iron were combined to produce composition E shown in the table in FIG. 1. Brake lining pads were made from composition E and tested on the vehicle.

Test schedule 136L indicated an effectiveness of composition E for 30 mph (48.3 Km/H) as illustrated by curve 140 in FIG. 2 and for 60 mph (96.6 Km/H) by curve 142 in FIG. 3. During the test on composition E the measured noise showed an improvement over composition D and a projected wear rate for the system was about 37,000 miles.

In conclusion, the test performed indicate that mill scale could be substituted for sponge iron without a substantial change in performance of a friction material as long as the ratio of mill scale to sponge iron is in a range of between 1:10 to 1:1.

I claim:

1. In a friction material having from 20–50% by weight of a sponge iron particle combined with friction modifiers and a reinforcing fiber held in a matrix by a phenolic resin, said sponge iron imparting a high cold coefficient of friction and a relatively low coefficient of wear on engagement of the friction material with another member during a brake application, the improvement comprising:

substituting from 14–33% by weight of mill scale for said sponge iron while said friction material retains substantially the same operational characteristics.

2. In the friction material as recited in claim 1, wherein said mill scale consists of a mixture of FeO, $Fe_2O_3$ and $Fe_3O_4$.

3. In the friction material as recited in claim 1, wherein the ratio of mill scale to sponge iron is in a range between 1:10 and 1:1.

4. In the friction material as recited in claim 2, wherein at least 50% of the mill scale has a particle size less than +60 mesh.

5. A friction material comprising sponge iron particles, mill scale, friction modifiers and steel fiber retained in a phenolic resin matrix, said sponge iron and mill scale imparting a high cold coefficient of friction with a relatively low coefficient of wear while maintaining an acceptable noise level during a brake application, the ingredients in said friction material consisting in the following approximate percentages by weight of the friction material:

Sponge Iron: 19–45%;
Mill Scale: 14–335;
Friction Modifiers: 2–22%; and
Phenolic Resin: 7–10%.

* * * * *